No. 838,814.  
PATENTED DEC. 18, 1906.  
E. C. SENDELBACH.  
WHEEL HUB.  
APPLICATION FILED MAR. 24, 1906.

Witnesses  
A. J. McCauley.  
Wells L. Church.

Inventor:  
Edward C. Sendelbach  
by Bakewell & Cornwall Att'y's.

UNITED STATES PATENT OFFICE.

EDWARD C. SENDELBACH, OF EAST ST. LOUIS, ILLINOIS.

WHEEL-HUB.

No. 838,814.  Specification of Letters Patent.  Patented Dec. 18, 1906.

Application filed March 24, 1906. Serial No. 307,854.

*To all whom it may concern:*

Be it known that I, EDWARD C. SENDELBACH, a citizen of the United States, residing at East St. Louis, Illinois, have invented a certain new and useful Improvement in Wheel-Hubs, of which the following is a full, clear, and exact description, such as will enable others skilled in the art to which it appertains to make and use the same, reference being had to the accompanying drawings, forming part of this specification, in which—

Figure 1:
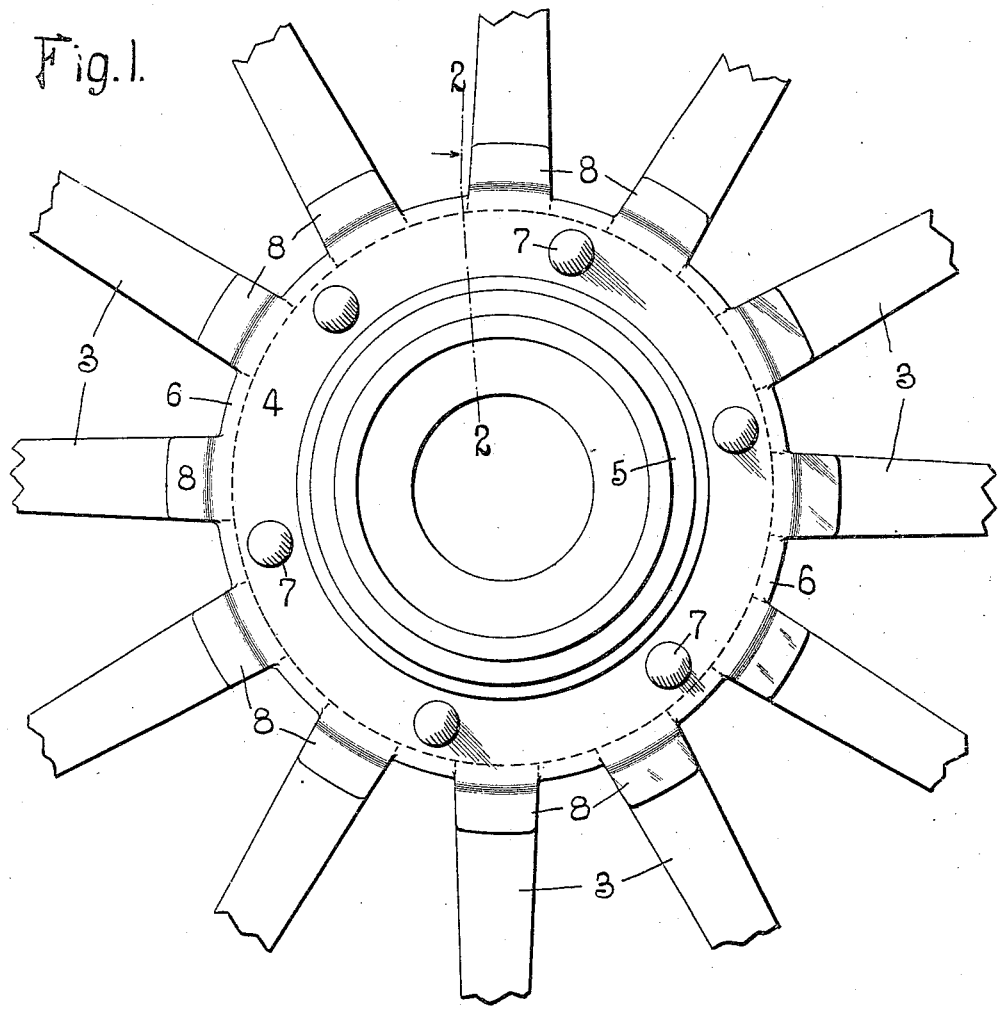
Figure 2:
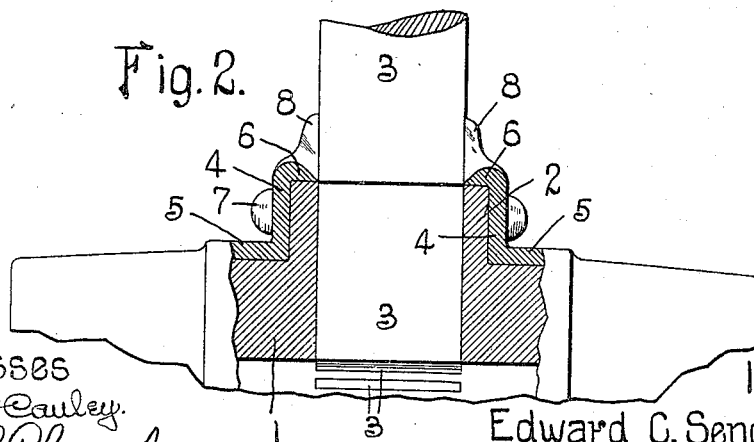

Figure 1 is an end view of a wheel-hub embodying the features of my invention, and Fig. 2 is a sectional view taken on the line 2 2 of Fig. 1.

This invention relates to wheels for vehicles, and particularly to the type of wheels which have wooden hubs and spokes.

The object of my invention is to provide improved means for strengthening the spokes of a wheel, so that they will not break or become loose when they are subjected to lateral strains. To this end the hub of the wheel is provided with an enlarged central portion which receives the spokes of the wheel, and said enlarged portion is clamped between two coöperating members formed of metal and provided with annular flanges which surround the peripheral edges of the enlarged portion of the hub, said annular flanges being provided with radially-projecting braces that engage the sides of the spokes of the wheel and prevent them from breaking or becoming loose when they are subjected to lateral strains.

Referring to the drawings, which represent the preferred form of my invention, 1 designates the wooden hub of a wheel provided with an enlarged central portion 2, into which the spokes 3 of the wheel are driven. The side faces of said enlarged portion lie in planes substantially perpendicular to the axis of the hub and are engaged by the flanges 4 of metal shells or jackets 5, which surround the hub. The flanges 4 are provided with annular flanges 6, that surround the peripheral edges of the enlarged central portion 2, and bolts or rivets 7 are passed through said enlarged portion and through the flanges 4 of the metal shells to hold these parts firmly together and compress the enlarged portion of the hub both endwise and radially, thereby affording a solid foundation for the ends of the spokes.

To prevent the spokes from breaking or becoming loose when they are subjected to lateral strains, the annular flanges 6 of the metallic sheets are provided with integral braces 8, that project radially and engage the outer side faces of the spokes. Accordingly as these braces are formed integral with an annular angle a very strong structure is produced which imparts great strength to the spokes.

Having thus described my invention, what I claim as new, and desire to secure by Letters Patent, is—

1. A wheel-hub consisting of a wooden body provided with a central enlarged portion, metallic shells surrounding said body and provided with radially-extending flanges between which said central enlarged portion is confined, annular flanges formed integral with said radial flanges and extending at approximately rectangles thereto for surrounding the peripheral edges of said enlarged portion, and braces formed integral with said annular flanges for bearing against the spokes of the wheel; substantially as described.

2. A wheel-hub consisting of a wooden body provided with a central enlarged portion having its side faces lying in planes substantially perpendicular to the axis of the hub, metallic shells surrounding said body and provided with radially-extending flanges which bear against the side faces of said enlarged portion and with annular flanges extending at right angles to the radially-extending flanges for surrounding the peripheral edges of said enlarged portion, radially-projecting braces formed integral with said annular flanges for bearing against the outer faces of the spokes of the wheel, and fastening devices extending through the enlarged portion of the hub and through said radially-extending flanges at points intermediate the spokes of the wheel; substantially as described.

In testimony whereof I hereunto affix my signature, in the presence of two witnesses, this 22d day of March, 1906.

EDWARD C. SENDELBACH.

Witnesses:
WELLS L. CHURCH,
GEORGE BAKEWELL.